Patented Sept. 29, 1931

1,825,501

UNITED STATES PATENT OFFICE

GEORGE BARSKY, OF NEW YORK, N. Y., AND GODFREY B. WALKER, OF ROSELLE, NEW JERSEY, ASSIGNORS TO AMERICAN CYANAMID COMPANY, OF NEW YORK, N. Y., A CORPORATION OF MAINE

METHOD OF FLOATING ORES

No Drawing.  Application filed December 13, 1929.  Serial No. 413,931.

This invention relates to a method of recovering minerals, such as sulphides or oxides, from ores by subjecting the same to a flotation operation in the presence of a suitable flotation promoting reagent.

We have found that satisfactory recoveries of the values from copper and zinc sulphide ores may be obtained when the same are subjected to flotation operations in the presence of the class of reagents of which Hector's base is a type. An example of the Hector's base used is diphenyl-diimino-tetrahydro-thiodiazole. The Hector's base was prepared according to the directions given in Berichte 22, page 1177.

These reagents may be represented by the following structural formula:

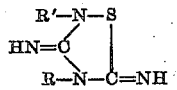

where R is an aryl or an alkyl hydrocarbon group, such as phenyl, tolyl, naphthyl, methyl, ethyl, etc., and R' is the same or is hydrogen.

As illustrating the recoveries which may be expected from copper ores which such reagent, an ore was chosen showing the following analysis:

|  | Per cent |
|---|---|
| Total copper | 4.60 |
| Oxide copper | 0.02 |
| Total iron | 20.2 |
| Arsenic | 0.34 |
| Insoluble | 69.40 |

This ore was stage crushed to minus ten mesh and then ground in a steel rod mill at one to one dilution with 4.0 lbs. of lime per ton of ore for a twenty-two minute period. The pH of the resulting pulp was 10.1. The flotation operation was carried out in a subaerated flotation machine, with a pulp density of 22% solids. Since Hector's base is insuluble in water, the hydrochloride was prepared and used in the amount of 0.0125 lbs. per ton, together with 0.06 lbs. of pine oil per ton. One minute was allowed for agitation before air was admitted and a concentrate floated for three minutes, after which a middling was floated for seven minutes. A concentrate was recovered which contained 92.1% of the copper, while the middling contained 5.3% of the copper. The total recovery of copper was therefore 97.4%.

A similar operation was conducted on a zinc ore. This ore analyzed as follows:

|  | Per cent |
|---|---|
| Zinc (sulphide) | 3.00 |
| Iron | 1.39 |
| Insuluble | 8.6 |
| Calcium oxide | 28.85 |
| Magnesium oxide | 16.36 |

The ore was stage crushed to minus twenty mesh and then ground in a steel rod mill at one to one dilution for a five minute period. The resulting pulp showed a pH of 8.8. The pulp was transferred to a subaerated flotation machine and diluted to 22% solids. 0.1 lbs. of a hydrochloride of Hector's base per ton of ore, together with 1.0 lbs. of copper sulphate per ton and 0.12 lbs. of pine oil per ton were added to the machine. One minute was allowed for agitation and then a concentrate was removed for three minutes, followed by a middling for four minutes. The same quantity of pine oil as above was added to the middling float. As a result of this operation 98.8% of the zinc was recovered as a concentrate and 0.7% in the middling, giving a total zinc recovery of 99.5%.

While certain ores and reagents have been enumerated in the above description, yet it is understood that we do not wish to be limited specifically thereto, as these substances have been mentioned as typical of a class and the invention is to be construed broadly and restricted only by the scope of the claims.

What we claim is:

1. A method of recovering minerals from ores which comprises subjecting said ores to a froth flotation operation in the presence of an imino thiodiazole as a promotor.

2. A method of recovering minerals from ores which comprises subjecting said ores to a froth flotation operation in the presence of a di-imino thiodiazole as a promotor.

3. A method of recovering minerals from ores which comprises subjecting said ores to a froth flotation operation in the presence of a di-imino di-aryl thiodiazole as a promotor.

4. A method of recovering minerals from ores which comprises subjecting said ores to a froth flotation operation in the presence of a promotor having the following structural formula:

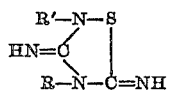

where R is an aryl or alkyl group and R' is an aryl or alkyl group or hydrogen.

5. A method of recovering minerals from ores which comprises subjecting said ores to a froth flotation operation in the presence of a diimino-diphenyl-tetrahydro-thiodiazole.

6. A method of recovering minerals from ores which comprises subjecting said ores to a froth flotation operation in the presence of diimino-diphenyl-tetrahydro-thiodiazole hydrochloride.

In testimony whereof, we have hereunto subscribed our names this 11th day of December 1929.

GEORGE BARSKY.
GODFREY B. WALKER.